No. 766,206. PATENTED AUG. 2, 1904.
C. R. WESTLING.
CLOSURE FOR BARRELS OR THE LIKE.
APPLICATION FILED OCT. 10, 1903.
NO MODEL.
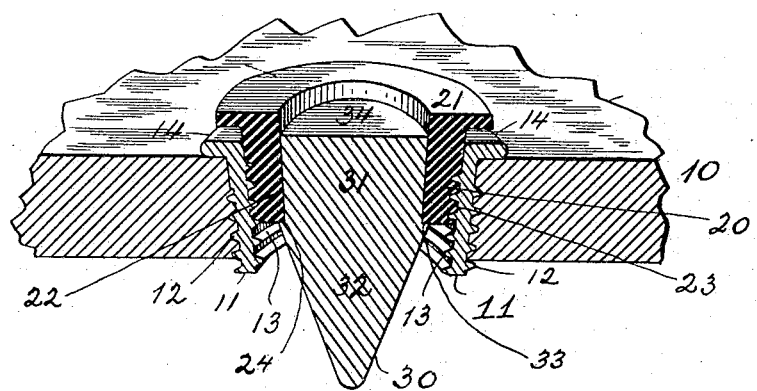
Witnesses
Herman Meyer
Bartlett J. Smith
Charles R. Westling Inventor
By His Attorney William R. Baird No. 766,206. Patented August 2, 1904.

UNITED STATES PATENT OFFICE.

CHARLES R. WESTLING, OF JERSEY CITY, NEW JERSEY.

CLOSURE FOR BARRELS OR THE LIKE.

SPECIFICATION forming part of Letters Patent No. 766,206, dated August 2, 1904.

Application filed October 10, 1903. Serial No. 176,462. (No model.)

*To all whom it may concern:*

Be it known that I, CHARLES R. WESTLING, a citizen of the United States, and a resident of Jersey City, in the county of Hudson and State of New Jersey, have invented certain new and useful Improvements in Closures for Barrels or the Like, of which the following is a specification.

This invention relates to closures for barrels and the like; and its novelty consists in the construction and adaptation of the parts.

The drawing is a central transverse section and partial perspective of a portion of a barrel equipped with my improved device.

In the drawing, 10 represents a portion of the head or body of a barrel or similar receptacle having an aperture adapted for the insertion of the closure to be described.

11 is a rigid bushing, preferably made of metal. It is shown in the drawing as frusto-conical in form; but it may be also made cylindrical. The conical form adds something to its efficiency. It is externally threaded at 12 12 and internally threaded at 13 13. If the external threads are made right-handed, the internal threads are made left-handed, and vice versa. It is provided with an external outwardly-projecting annular flange 14, adapted to prevent the entrance of the body of the bushing into the barrel by the application of external force.

Within the rigid bushing 11 is placed an elastic bushing 20, preferably made of rubber. This may be either cylindrical or frusto-conical in form or otherwise shaped to fit the interior of the rigid bushing if the thread were removed. It is provided with an external outwardly-projecting annular flange 21, adapted to rest upon the outer edge of the rigid bushing. The inner side 22 and outer side 23 of this bushing are preferably made smooth. Within the elastic bushing is placed a plug 30, made of wood or similar suitable material.

The body 31 of the plug is made cylindrical or frusto-conical or otherwise to conform to the contour of the aperture in the elastic bushing. The head 32 of the plug is conical and where it joins the body 31 is provided with a shoulder 33, adapted to fit against the lower inner edge 24 of the elastic bushing.

The plug 30 is preferably made a little larger in diameter than the inner aperture of the elastic bushing, so as to compress the walls of the latter when inserted within the latter and to insure a gas-tight fit. The body 31 of the plug is also made shorter than the length of the inner wall of the elastic bushing, so that its base 34 shall be below the external boundary of the bushing 20. This is for the purpose of permitting the insertion of a tool or faucet within the bushing 20 and preventing blows directed against the bushings from striking the plug.

The mode of using this form of closure illustrated in the drawing is as follows: The rigid bushing 11 is first screwed into or otherwise secured within the aperture or tap-hole in the barrel 10 made to receive it. The elastic bushing 20 is then screwed into place, and finally the plug is inserted. The smooth outer wall of the elastic bushing 20 engages with the threads 13 on the inner side of the rigid bushing 11, and it is thereby held in place, while the shoulder 33 on the plug 30 prevents the ejection of the latter by any pressure existing or developed within the barrel. When the barrel is to be tapped, the shank of the dispensing-faucet is placed against the base 34 of the plug and the latter is driven into the interior of the barrel, the walls of the bushing 20 contracting to permit of its passage, but forming a tight closure, until the base of the plug has passed the lower inner edge of the bushing 20. The plug thus driven into the barrel is then recovered through the bunghole when the barrel is emptied of its contents and cleansed.

Should it be desired to remove the elastic bushing for any purpose, such as renewal, &c., it is screwed out, and the thread with which it engages running in the opposite direction from that of the exterior thread of the rigid bushing, the force necessarily used in removing the elastic bushing will not tend to remove the rigid bushing, but will rather tend to tighten it in its position.

What I claim is—

1. A closure for the tap-hole of a barrel or the like, comprising a rigid bushing provided with an external right-handed thread adapted to engage with a suitable aperture in the barrel and provided with an internal aperture having a left-handed thread, together with an elastic bushing adapted to be placed within the rigid bushing and a substantially inelastic plug fitting tightly within the elastic bushing and provided with a substantially square shoulder adapted to rest against the inner edge thereof to prevent its withdrawal.

2. A closure for the tap-hole of a barrel or the like, comprising a rigid bushing externally threaded to engage with an aperture in the body of the barrel and having an inner aperture threaded in the reverse direction, an elastic bushing adapted to be placed within the rigid bushing and a substantially inelastic plug fitting tightly within the elastic bushing and provided with a substantially square shoulder adapted to rest against the inner edge thereof to prevent its withdrawal.

3. A closure for the tap-hole of a barrel or the like, comprising a rigid bushing externally threaded and adapted to engage in an aperture in the body of the barrel and having an internal aperture, an inner elastic bushing adapted to be placed within the rigid bushing, means for holding the elastic bushing within the rigid bushing by its own inherent elasticity, and a substantially inelastic plug fitting tightly within the elastic bushing and provided with a conical point and a substantially square shoulder adapted to rest against the inner edge thereof to prevent its withdrawal.

Witness my hand, this 9th day of October, 1903, at the city of New York, in the county and State of New York.

CHARLES R. WESTLING.

Witnesses:
 HERMAN MEYER,
 ESTELLE M. TITUS.